United States Patent
Schoner et al.

(10) Patent No.: US 10,462,465 B2
(45) Date of Patent: Oct. 29, 2019

(54) SYSTEM AND METHOD FOR GRAPHICS COMPRESSION

(71) Applicant: Avago Technologies General IP (Singapore) Pte. Ltd., Singapore (SG)

(72) Inventors: Brian Francis Schoner, Fremont, CA (US); Anand Pande, Bangalore (IN); Praveen Vadakkumthodam Radhakrishnan, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 537 days.

(21) Appl. No.: 14/588,615

(22) Filed: Jan. 2, 2015

(65) Prior Publication Data

US 2016/0196632 A1 Jul. 7, 2016

(51) Int. Cl.
| | |
|---|---|
| *H04N 19/463* | (2014.01) |
| *G06T 9/00* | (2006.01) |
| *H04N 19/136* | (2014.01) |
| *H04N 19/176* | (2014.01) |
| *H04N 19/593* | (2014.01) |

(52) U.S. Cl.
CPC ............ *H04N 19/136* (2014.11); *G06T 9/00* (2013.01); *H04N 19/176* (2014.11); *H04N 19/463* (2014.11); *H04N 19/593* (2014.11)

(58) Field of Classification Search
CPC .. H04N 19/176; H04N 19/463; H04N 19/136; H04N 19/593; G06T 1/20; G06T 9/00

USPC ........................................ 345/505, 555, 501
See application file for complete search history.

(56) References Cited

U.S. PATENT DOCUMENTS

| | | | |
|---|---|---|---|
| 7,920,749 B1 * | 4/2011 | Donovan | H04N 19/105 382/233 |
| 7,983,498 B1 * | 7/2011 | Donovan | H03M 7/40 375/240 |
| 2011/0157192 A1 * | 6/2011 | Gong | H04N 19/436 345/505 |
| 2013/0084018 A1 * | 4/2013 | Nystad | G06K 9/36 382/232 |

OTHER PUBLICATIONS

Wikipedia, Texture Compression, downloaded Apr. 3, 2015, pp. 1-2, http://en.wikipedia.org/wiki/Texture_compression.

* cited by examiner

*Primary Examiner* — Jacinta M Crawford
(74) *Attorney, Agent, or Firm* — Morgan, Lewis & Bockius LLP (57) ABSTRACT

A system and method for processing graphics are provided. Pixel data may be received for a pixel block. Endpoints for the values of the pixels in the pixel block may be determined. A weight for the pixels in the pixel block may be determined in four dimensions corresponding to the endpoints. A compressed data block representative of the pixel block may be generated in response to the endpoints for the pixel block and the weight for the pixels of the pixel block in the four dimensions corresponding to the endpoints.

20 Claims, 9 Drawing Sheets

SYSTEM AND METHOD FOR GRAPHICS COMPRESSION

TECHNICAL FIELD

This disclosure relates to systems and methods for graphics processing.

BACKGROUND

Rapid advances in electronics and communication technologies, driven by immense customer demand, have resulted in the worldwide adoption of devices that display a wide variety of video content and graphics. Examples of such devices include smartphones, flat screen televisions, and tablet computers. Improvements in graphics processing techniques will continue to enhance the capabilities of these devices.

DETAILED DESCRIPTION

The discussion below makes reference to systems and methods for graphics processing. In past systems, static graphics could be compressed using complex algorithms for hours before use. Once compressed, the graphics could be uncompressed many times using the optimized compression. In more recent developments, dynamic graphics such as video are more frequently used in graphic displays. For example, video may be projected onto a graphically generated surface. Faster compression and more flexible compression methods are needed for dynamic compression. Previous systems and algorithms are typically not well suited for such applications.

Figure 1:
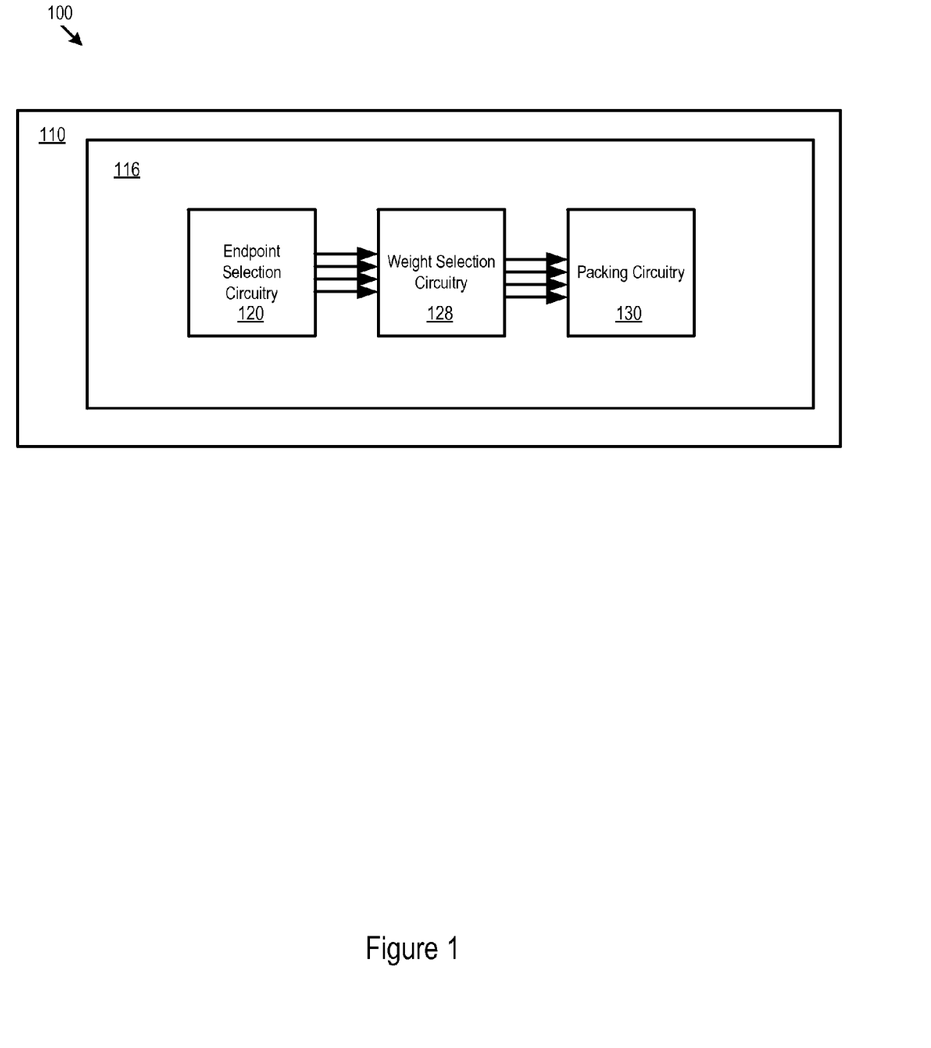
FIG. 1 is a block diagram illustrating a system for processing graphics.

One implementation of a system for processing graphics is described in FIG. 1. The system 100 includes a graphics processor 110. The graphics processor 110 may include a graphics compression circuitry 116 that receives graphics to be compressed. The graphics may include various types of graphics. Some of the graphics may be static graphics such as text, menus, and illustrations. Some of the graphics may be dynamic graphics and may include, for example, video.

The compression circuitry 116 may process the graphics in a multi-plane space. For example, the graphics may be represented in a three plane space such as a red plane, a green plane, and a blue-alpha plane (R/G/BA). The blue-alpha plane (BA) may be where one or more bits may be reserved to express alpha and the rest of the bits are allocated to represent blue. The alpha channel may, for example, be used to represent opacity. In other scenarios, the graphics may be represented in separate planes (e.g. a red plane, a green plane, a blue plane, and an alpha plane, also denoted R/G/B/A) where the bits are distributed to the separate planes. As such, with regard to the graphics compression circuitry 116, the circuitry may process three, four, or any "n" number of planes in representing the values of the pixel block.

Figure 2:
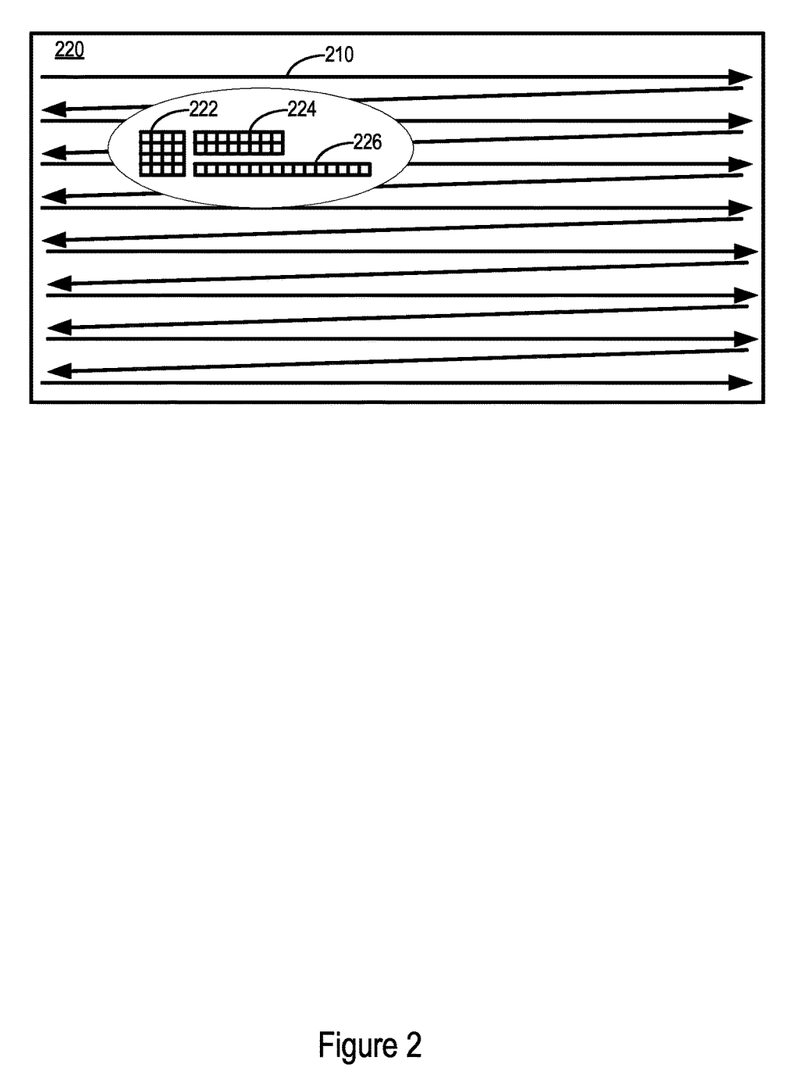
FIG. 2 is a graphical representation of pixel blocks in an image.

The compression circuitry 116 may include an endpoint selection circuitry 120. The endpoint selection circuitry 120 may be operable to receive pixel data for a pixel block and determine endpoints for the values of the pixels in the pixel block. The pixel blocks may be square blocks, for example 4×4, 8×8, or 16×16 pixels. The pixel blocks may also be non-square blocks. For example, pixel blocks may have more pixels along the direction that corresponds with the raster direction, such as the horizontal direction in most systems, than along the non-raster direction. This would allow the system to process the data more closely with raster order which may be beneficial when processing information that is typically processed in raster order, for example video. In some examples, the pixel blocks may even have a width of a single pixel along the non-raster direction, for example a line of pixels extending along the raster direction. Accordingly, in some systems the pixel blocks may be 8×2 or 16×1 pixels. One example of the pixel blocks is shown in FIG. 2. The raster direction 210 is illustrated as horizontal across the image 220. Illustrated on the image 220 is a 4×4 pixel block 222, a 8×2 pixel block 224, and a 16×1 pixel block 226.

Referring again to FIG. 1, the endpoint selection circuitry 120 may select endpoints for each plane. For example, two endpoints may be selected for each plane such that the pixel values for that plane may be represented as a weighting value between the two endpoints.

Once the endpoints are selected by the endpoint selection circuitry 120, the selected endpoints may be communicated to a weight selection circuitry 128. The weight selection circuitry 128 may receive pixel data for the pixel block and determine a weight for each pixel of the pixel block. As such, a weight may be determined for each plane relative to the selected endpoints for each plane. The endpoints and the weights are provided to a packing circuitry 130. The packing circuitry 130 may receive the endpoints for the pixel block and the weight for each pixel of the pixel block corresponding to the endpoints. The packing circuitry 130 generates compressed data representative of the pixel block based on the endpoints and the weights. For example, the endpoints for the pixel block may be communicated then each pixel value may be represented as a weighting relative to the endpoints. The endpoints and weighting may be determined and communicated for each plane thereby representing each corresponding component of the pixel value.

Figure 3:
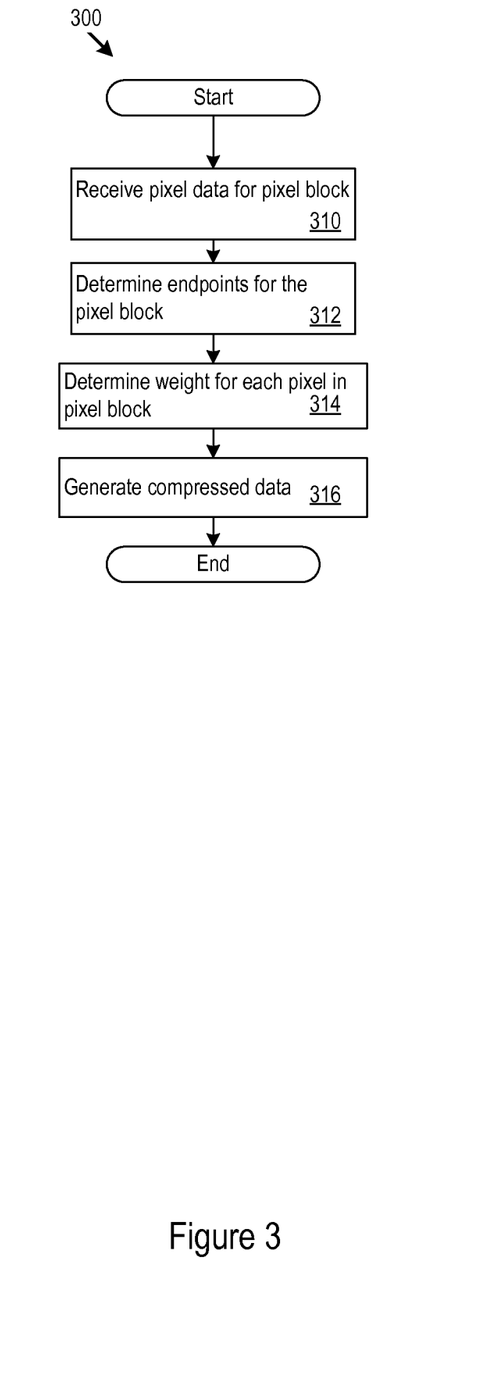
FIG. 3 is a flow chart of a method for processing graphics.

FIG. 3 is a flow chart illustrating a method for processing graphics. The method (300) may be carried out in a graphics processor that has been designed to carry out the steps discussed below. The method will be described as providing a four plane representation of the graphics; however, as discussed above a different number of planes may be used. The graphics processor may receive pixel data for a pixel block. (310) The endpoints for the values of the pixels in the pixel block may be determined. (312) The endpoints may be determined for each pixel block of the four planes. A weight for each pixel of the pixel block may be determined. (314) The weight for each pixel of the pixel block may be determined in each of four planes corresponding to the endpoints selected for the block by the endpoint selection circuitry. A compressed data block may be generated. (316). The compressed data block may be representative of the pixel block in response to the endpoints for the pixel block and the weight for each pixel of the pixel block in each of the four planes corresponding to the endpoints.

Figure 4:
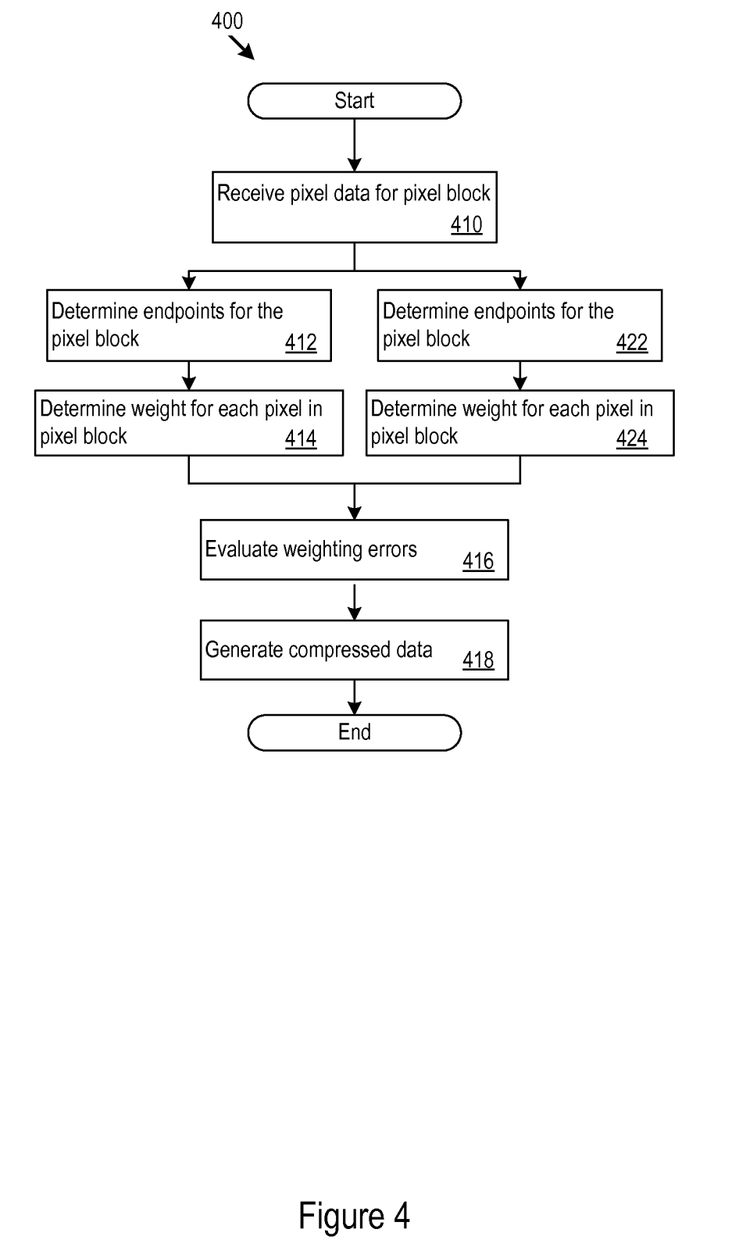
FIG. 4 is a flow chart of a method for processing graphics to select from two representations determined parallel.

FIG. 4 is a flow chart illustrating a method for processing graphics. The method may be carried out in a graphics processor that has been designed to carry out the steps discussed below. The graphics processor may receive pixel data for a pixel block and distribute the pixel data to be evaluated for compression relative to two different multi-plane spaces. (410) For example, a first branch may evaluate a four plane representation of the pixel data, while a second branch may evaluate a three plane representation of the pixel data. The endpoints for the values of the pixels in the pixel block may be determined. (412) The endpoints may be determined for the pixel block in each of the four planes. A weight for each pixel of the pixel block may be determined. (414) The weight for each pixel of the pixel block may be determined in each of four planes corresponding to the endpoints selected for the block by the endpoint selection circuitry. (412)

In the second branch, the endpoints for the values of the pixels in the pixel block may be determined. (422) The endpoints may be determined for the pixel block in each of the three planes. A weight for each pixel of the pixel block may be determined. (424) The weight for each pixel of the pixel block may be determined in each of three planes corresponding to the endpoints selected for the block by the endpoint selection circuitry. (422) The error of the weightings may be evaluated. (416) An error of the weightings determined in the four plane representation may be compared with the error of the weightings determined in the three plane representation. A compressed data block may be generated. (418). If the four plane representation has less error than the three plane representation, the compressed data block may be provided with the endpoints for the pixel block and the weight for each pixel of the pixel block in a four plane representation. If the three plane representation has less error, the compressed data block may be provided with the endpoints for the pixel block and the weight for each pixel of the pixel block in a three plane representation.

Further, to accommodate dynamic graphics the first branch and the second branch may be calculated in parallel circuits and the steps in one branch may occur simultaneously with steps in the other branch on the same pixel data. As such, determining a weight for each pixel of the pixel block in each of the three planes and generating a compressed data block in response to the endpoints for the pixel block and the weight for each pixel of the pixel block in each of the three planes can occur in parallel with the determining a weight for each pixel of the pixel block in each of the four planes and the generating a compressed data block in response to the endpoints for the pixel block and the weight for each pixel of the pixel block in each of the four planes. Further, the determining the weight for each pixel of the pixel block in each of the three dimensions and the determining the weight for each pixel of the pixel block in each of the four dimensions may occur simultaneously. Similarly, the generating of the compressed data block in response to the endpoints for the pixel block and the weight for each pixel of the pixel block in each of the three dimensions and the generating the compressed data block in response to the endpoints for the pixel block and the weight for each pixel of the pixel block in each of the four dimensions occur simultaneously.

Figure 5:
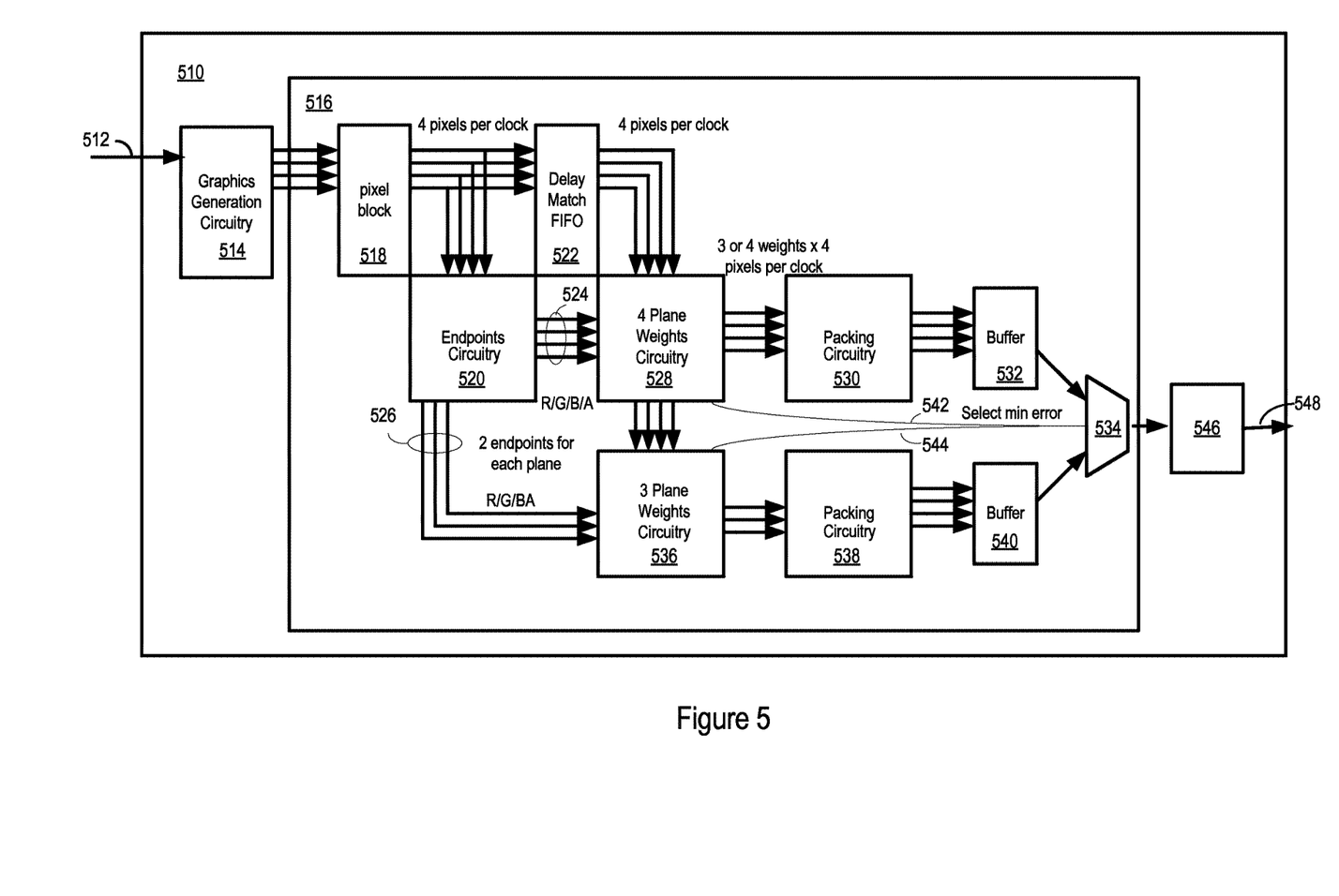
FIG. 5 is a block diagram illustrating a system for processing graphics to determine two representations in parallel.

FIG. 5 is a block diagram of a graphics processor that processes four plane and three plane compressions of pixel data in parallel. The graphics processor may compress each pixel block twice, once with 4 planes and once with 3 planes. The result with the smallest error is selected at the output. The system 500 includes a graphics processor 510. The graphics processor 510 may receive graphics parameters 512, including for example a video stream, from various sources. The graphics parameters 512 may be provided to a graphics generation circuitry 514. The graphics generation circuitry may provide graphics data to a graphics compression circuitry 516. The graphics received by the graphics compression circuitry 516 may include various types of static and dynamic graphics.

The compression circuitry 516 may process the graphics in a multi-plane space. For example, the graphics may be represented in a three plane space such as R/G/BA. In other scenarios, the graphics may be represented in separate planes R/G/B/A where the bits are distributed to the separate planes. As such, with regard to the graphics compression circuitry 516, the circuitry may process a three plane representation and a four plane representation, although processing multiple representations with another number of planes is also contemplated herein.

The graphics compression circuitry 516 may include a pixel block buffer 518. With regard to the system illustrated in FIG. 5 a 4×4 pixel block will be described, although as discussed above other size pixel blocks may also be utilized. The pixel block buffer 518 may provide the pixel data for the pixel block to an endpoint selection circuitry 520 and a delay match buffer 522.

The endpoint selection circuitry 520 may receive pixel data for a pixel block and determine endpoints for the values of the pixels in the pixel block. The pixel blocks may be square blocks, for example 4×4, 8×8, or 16×16 pixels. The pixel blocks may also be non-square blocks. For example, blocks may be used that have more pixels along the direction that corresponds with the raster direction, such as the horizontal direction in most systems, than along the non-raster direction. This would allow the system to process the data more closely with raster order which may be beneficial when processing information that is typically processed in raster order, for example video. In some examples, the pixel blocks may even have a width of a single pixel along the non-raster direction, for example a line of pixels extending along the raster direction. Accordingly, in some systems the pixel blocks may be 8×2 or 16×1. The endpoint selection circuitry 520 may select endpoints for each plane. For example, two endpoints may be selected for each plane such that the pixel values for that plane may be represented as a weighting value between the two endpoints.

Once the endpoints are selected by the endpoint selection circuitry 520, the selected endpoints 524 for the four plane representation may be communicated to a weight selection circuitry 528. The selected endpoints 524 may include two endpoints for each plane. In the example of four plane representation, two endpoints for the red plane, two endpoints for the green plane, two endpoints for the blue plane, and two endpoints for the alpha plane may be selected and communicated. The selected endpoints 526 for the three plane representation may also be communicated to the weight selection circuitry 536. In the example of three plane representation, two endpoints for the red plane, two endpoints for the green plane, and two endpoints for the blue-alpha plane may be selected and communicated.

The weight selection circuitry 528 may receive pixel data for the pixel block from the delay match buffer 522 and determine a weight for each pixel of the pixel block. As such, a weight may be determined for each plane relative to the selected endpoints for each plane. The endpoints and the weights are provided to a packing circuitry 530. The packing circuitry 530 may receive the endpoints for the pixel block and the weight for each pixel of the pixel block corresponding to the endpoints. The packing circuitry 530 generates compressed data representative of the pixel block based on the endpoints and the weights. For example, the endpoints for the pixel block may be communicated then each pixel value may be represented as a weighting relative to the endpoints. The endpoints and weighting may be determined and communicated for each plane thereby representing each corresponding component of the pixel value. The compressed data may be communicated to a buffer 532.

The weight selection circuitry 536 may receive pixel data for the pixel block from the delay match buffer 522 and determine a weight for each pixel of the pixel block. As such, a weight may be determined for each plane relative to the selected endpoints for each plane. The endpoints and the weights are provided to a packing circuitry 538. The packing circuitry 538 may receive the endpoints for the pixel block and the weight for each pixel of the pixel block corresponding to the endpoints. The packing circuitry 538 generates compressed data representative of the pixel block based on the endpoints and the weights.

The compressed data may be communicated to a buffer 540. A comparison circuitry 534 receives a first weighting error 542 from the weight selection circuitry 528 and a second weighting error 544 from the weight selection circuitry 536. The comparison circuitry 534 compares the first weighting error 542 with the second weighting error 544 to determine whether the four plane weighting or the three plane weighting has less error. If the first weighting error 542 has less error, the comparison circuitry 534 retrieves the compressed data represented in the four plane weighting from the buffer 532 and makes it available for further use, such as further processing 546, and/or transmission 548.

Figure 6:
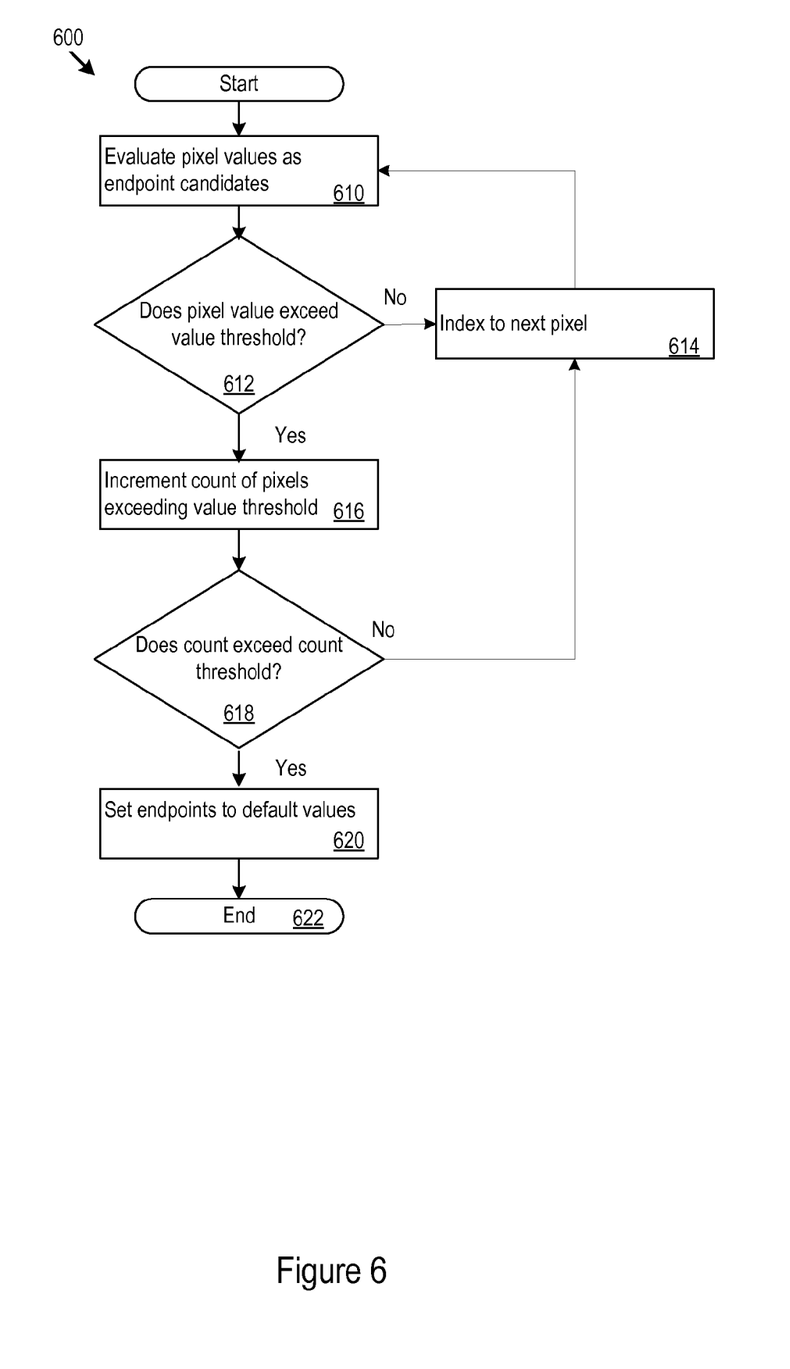
FIG. 6 is a flow chart of a method for selecting endpoints.

FIG. 6 is a flow chart illustrating a method for selecting endpoints. If a large number of bits are used to describe the endpoints, then the endpoints can be described very accurately. However, if the endpoints selected are near the ends of the range, a great number of very complex calculations may be required to express the pixel values in terms of weights relative to the endpoints and little compression may result from the great number of calculations. As such, in certain situations conditions can be identified and used to set the endpoints to default values. When the default values are used, the complex weighting calculations may be avoided and the saved bits from the endpoints may be reallocated to express the pixel values as the weights. The default endpoints may be the maximum and minimum values for the range of pixel values. This may be particularly beneficial when using dynamic graphics such as video.

In one general implementation, the values of the pixels in the pixel block can be evaluated to determine if the values exceed a value threshold. Then, the number of pixels that exceed the value threshold are evaluated to determine if the number of pixels exceed a pixel count threshold. The endpoints may be set to a default value in response to the number of pixels exceeding the pixel count threshold. The default value for the endpoints include a maximum pixel value and a minimum pixel value. For example, the minimum pixel value may be 0 and the maximum pixel value may be 255 for an 8 bit pixel value. In one example, a simple threshold may be used to select the maximum range endpoints. Maximum range endpoints may be selected when:

[1] the range (largest pixel value in the pixel block—smallest pixel value in the pixel block) exceeds a threshold (for example 140.) and [2] the number of values "close" (e.g. within 3) to maximum pixel value or the smallest pixel value is less than a count threshold (for example 9.) Accordingly, the bits typically used to express the endpoints can be allocated to the values by expanding the number of bits allocated to the weight for each pixel of the pixel block in response to setting the endpoints to the default value.

The method (600) is a simple algorithm to determine whether to use a specific calculated endpoint or the default endpoints (e.g. minimum and maximum pixel values). The pixel values may be evaluated endpoint candidates. (610) If the pixel value is the largest or smallest of the pixel block, it may be identified as an endpoint candidate. The values of the pixel may be evaluated to determine if the values exceed a value threshold. (612) The value threshold may be an upper threshold and/or a lower threshold. If the value of the pixel does not exceed the value threshold, the pixel is indexed to the next pixel in the block. (614) The next pixel is then evaluated (612). If the value of the pixel exceeds the pixel value threshold, the count of pixels exceeding the threshold is incremented. (616) The count of pixels exceeding the value threshold is evaluated relative to a pixel count threshold. (618) If the count of pixels exceeds the pixel count threshold, the endpoints may be set to the default endpoints. (620) The method may then end. (622) If the count of pixels does not exceed the pixel count threshold, the pixel may be indexed to the next pixel. (614) Then, the next pixel is then evaluated. (612)

Figure 7:
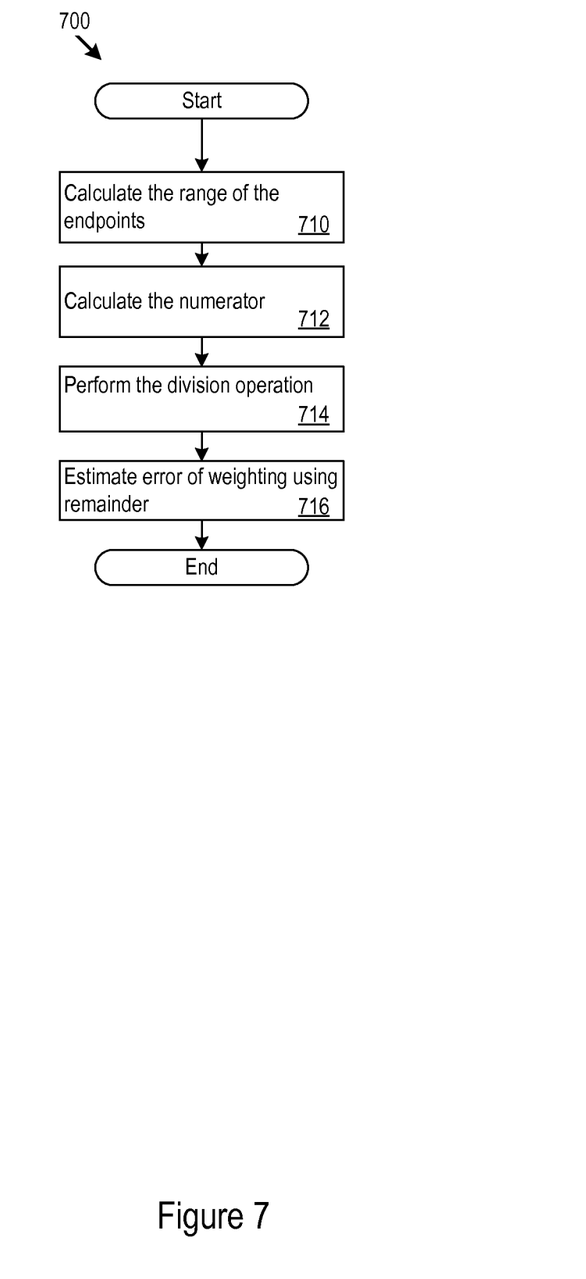
FIG. 7 is a flow chart of a method for determining the weighting of pixels in the pixel blocks.

FIG. 7 is a flow chart illustrating a method for determining the weighting for pixels and estimating an error for the weighting. Weights can represent linear interpolation of the endpoints. Finding optimal weights can be essentially accomplished with a division operation. Several algorithms have been used for determining weights. The weight may be calculated according to a component of the pixel value relative to the endpoints for each plane. Weights are computed with Weight=$K*(X-EMIN)/(EMAX-EMIN)$, K is generally $2^{(number\ of\ bits)}-1$, X is the component value of the pixel, EMIN is the lower endpoint, and EMAX is the upper endpoint. A simple division would require 4 or 5 shift-subtract-mux operations. Simple division may be preferred, because the remainder provides a "free" error estimate. The remainder is not the true error, because the decompression algorithm may round to an integer. However, other approaches require an interpolation step to get an error estimate, which can be nearly as expensive as the division itself. Simple division also works for cases where MAX−MIN=0, which is a problem for fast division.

In a four bit example, W15=round($15*(X-EMIN)/(EMAX-EMIN)$), where W15 is the 4 bit weight, X is the component value of the pixel, EMIN is the lower endpoint, and EMAX is the upper endpoint. In this implementation, the dividend includes the value of the pixel and may be decreased by the lower endpoint. The divisor includes the range of the endpoints. In this scenario, a simple bit-serial division can efficiently compute the 3, 4 or 5-bit weights.

For efficient processing, the range of the end points may be calculated. (710) The formula for the range of endpoints is DEN=EMAX−EMIN and can be computed once for all weights for one component. Then, the numerator can be calculated. (712) The equation for the numerator is NUM=$15*(X-EMIN)$ and can be calculated for each pixel which requires about 3 adds for each weight. Finally, a division operation may be used on the numerator and the denominator to generate a weight for the pixel value relative to the endpoints. (714) For quicker processing, NUM/DEN can be completed using a simple bit-serial division:

If (NUM>=(DEN*8)){NUM-=DEN*8; Weight+=8;}
If (NUM>=(DEN*4)){NUM-=DEN*4; Weight+=4;}
Etc.
If (NUM>=(DEN/2)){NUM-=DEN; Weight++;}//round to nearest weight
Remainder=NUM after algorithm is completed The remainder may be used as an estimate of the error of the weighting. (716)

Figure 8:
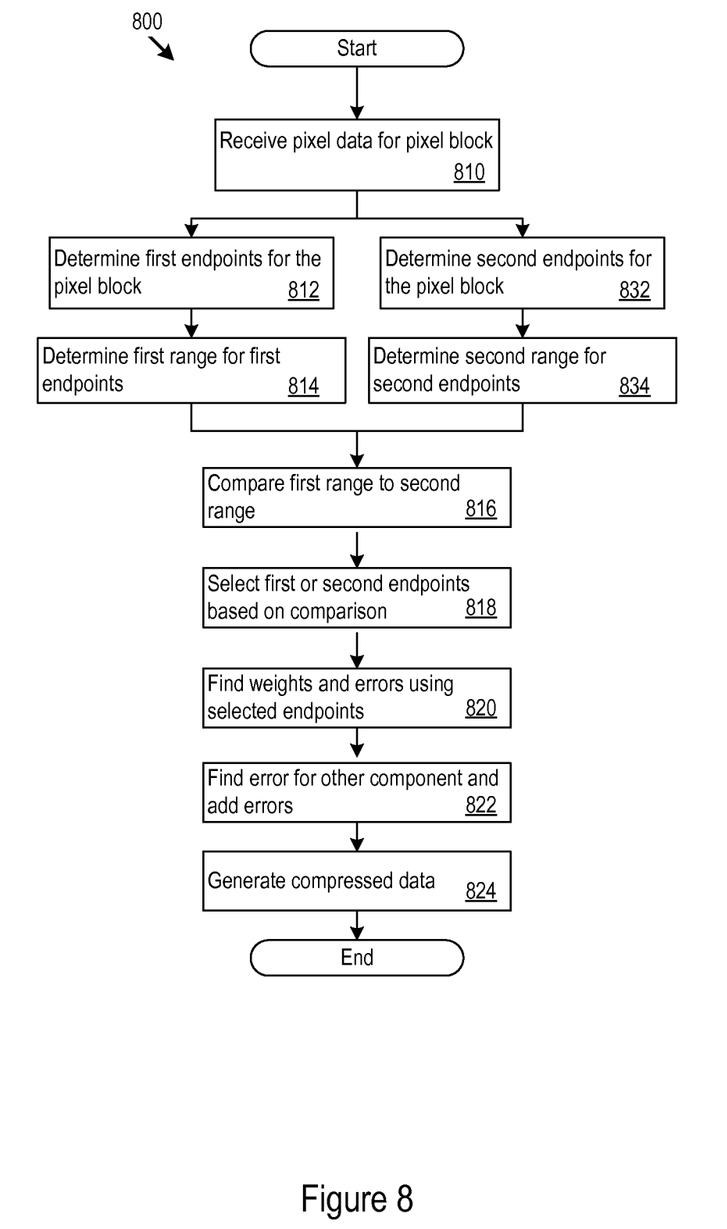
FIG. 8 is a flow chart of a method for selecting endpoints for a two component plane.

FIG. 8 is a flow chart illustrating a method for selecting endpoints for a two component plane. The endpoints with the best weight for a single component axis can be used as the best weight for the plane. Although the weight may be found by searching one component, an error estimate for both components may be required. An easy method to calculate the weight may be to interpolate the "other" component, and subtract to find the error. One exemplary method for selecting endpoints in a multi-component plane is provide in method 800.

The method 800 may be implemented in a graphics processor designed to perform each of the steps below. Pixel data for a pixel block is received. (810) The first endpoints for first component values of the pixels in the pixel block are determined. (812) The first endpoints corresponding to a first component of a multi-component plane. The multi-component plane may be, for example, the BA plane. A first error for the first endpoints is determined. (814) The second endpoints for second component values of the pixels in the pixel block are determined. (832) The second endpoints correspond to a second component of the multi-component plane. A second error for the second endpoints is determined. (834) The first error for the first endpoints is compared to the second error for the second endpoints. (816) One of the first endpoints and the second endpoints is selected as the selected endpoints in response to the comparing of the first error to the second error. (818) A compressed data block representative of the pixel block is generated in response to the selected endpoints for the pixel block. (820) As such, a similar implementation where endpoints for a three or four component plane may selected. As such, endpoints having the smallest of three or four error values respectively may selected. Accordingly, it can be seen that this methodology may be applied to any "n" multi-component scenario.

Figure 9:
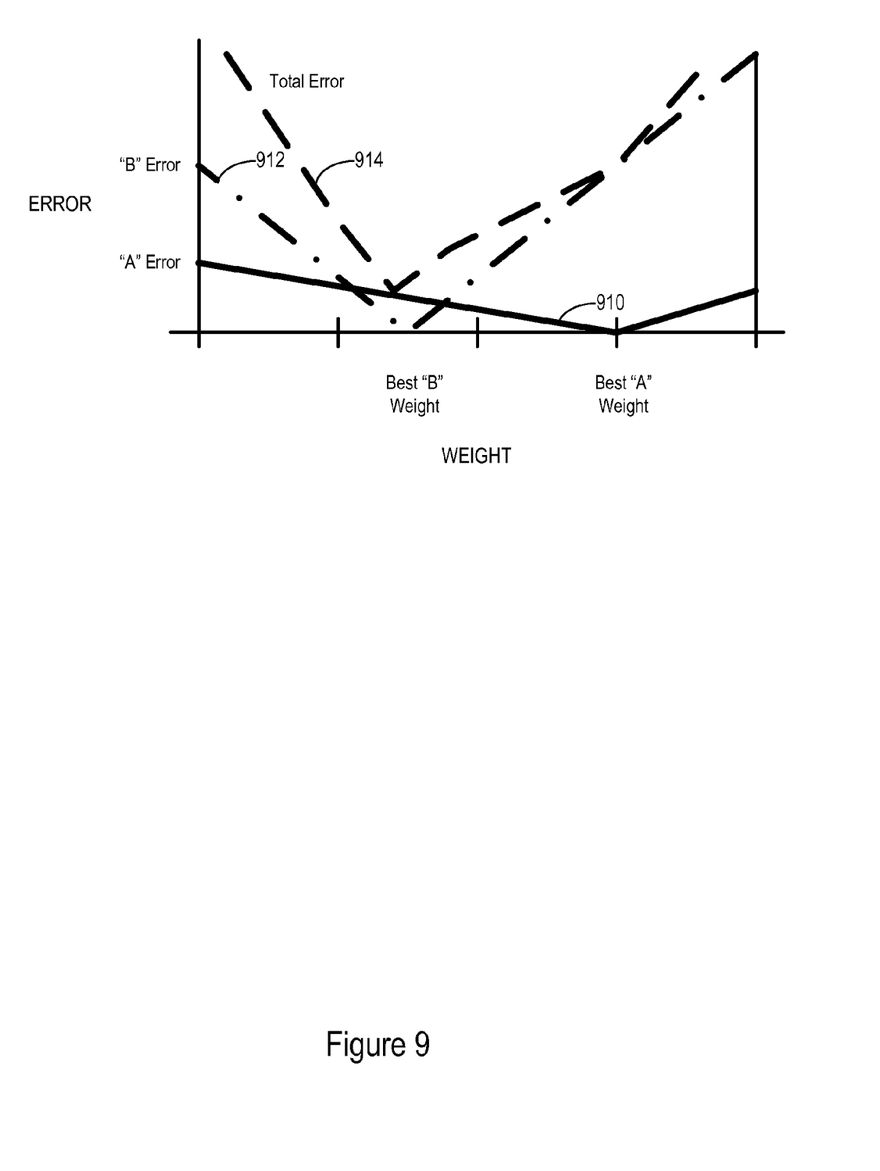
FIG. 9 is a graph illustrating the error for a two component plane.

FIG. 9 is a graph illustrating the error with respect to weight for a multi-component plane. Line 810 illustrates the error to weight relationship of the "A" component for an "AB" plane. Line 812 illustrates the error to weight relationship of the "B" component for an "AB" plane. Line 814 illustrates the total error to weight relationship of the both components for an "AB" plane. As was previously understood, the best total weight is always the best weight for the "largest" endpoints.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A graphics processor comprising: endpoint selection circuitry operable to:
    receive pixel data for a pixel block;
    determine first endpoints for first values of pixels in the pixel block and a first error for the first endpoints, the first endpoints corresponding to a first component of a multi-component plane comprising a first number of components;
    determine second endpoints for second values of the pixels in the pixel block and a second error for the second endpoints, the second endpoints corresponding to a second component of another multi-component plane comprising no more than a second number of components, the second number of components being less than the first number of components; and
    select one of the first endpoints or the second endpoints as selected endpoints based at least in part on a comparison of the first error to the second error; and
packing circuitry operable to:
    receive the selected endpoints for the pixel block and a weight for each pixel of the pixel block corresponding to the selected endpoints; and
    generate a compressed data block representative of the pixel block.

2. The graphics processor according to claim 1, wherein one of the components of the multi-component plane comprises an independent alpha component.

3. The graphics processor according to claim 2, wherein the multi-component plane comprises a red component, a green component, and a blue component.

4. The graphics processor according to claim 1, wherein the pixel block is a non-square pixel block and the pixel block includes a greater number of pixels along a raster direction than a non-raster direction.

5. The graphics processor according to claim 4, wherein the pixel block includes a width of a single pixel along the non-raster direction.

6. The graphics processor according to claim 5, wherein the pixel block includes a width of eight pixels along a raster direction and a width of two pixels along a non-raster direction.

7. The graphics processor according to claim 5, wherein the pixel block includes a width of sixteen pixels along a raster direction and a width of one pixel along a non-raster direction.

8. The graphics processor of claim 1, further comprising:
weight selection circuitry operable to receive the pixel data for the pixel block, the weight selection circuitry operable to determine the weight for each pixel of the pixel block in each plane corresponding to the selected endpoints for the block.

9. A method for processing graphics comprising:
receiving, in a graphics processor, pixel data for a pixel block;
determining, in the graphics processor, a first error for determined first endpoints for values of the pixels in the pixel block, the determined first endpoints corresponding to a first component of a multi-component plane comprising a first number of components;
determining, in the graphics processor, a second error for determined second endpoints for second values of the pixels in the pixel block, the determined second endpoints corresponding to a second component of another multi-component plane comprising no more than a second number of components that is less than the first number of components;
selecting one of the first or second endpoints as selected endpoints based at least in part on a comparison of the first error to the second error; and
generating, in the graphics processor, a compressed data block representative of the pixel block in response to the selected endpoints for the pixel block and a weight for each pixel of the pixel block corresponding to the selected endpoints.

10. The method according to claim 9, further comprising:
determining, in the graphics processor, a weight for each pixel of the pixel block in each plane corresponding to the selected endpoints for the pixel block.

11. The method according to claim 10, wherein the determining the first error occurs substantially in parallel with the determining the second error.

12. The method according to claim 10, further comprising:
determining, in the graphics processor, the first and second endpoints.

13. The method according to claim 10, wherein the determining the weight for each pixel of the pixel block includes a division.

14. The method according to claim 13, wherein a dividend of the division comprises a value of the pixel and a divisor of the division comprises a range of the selected endpoints.

15. The method according to claim 14, wherein a remainder of the division is used as an estimate of an error for the weighting.

16. The method according to claim 9, wherein selecting one of the first or second endpoints further comprises:
determining whether values of the pixels in the pixel block exceed a value threshold;
determining whether a number of pixels, that exceed the value threshold, exceed a pixel count threshold; and
setting the endpoints to a default value in response to the number of pixels exceeding the pixel count threshold.

17. The method according to claim 16, wherein the default value for the endpoints include a maximum range value and a minimum range value.

18. The method according to claim 16, wherein selecting endpoints further comprises:
expanding a number of bits allocated to the weight for each pixel of the pixel block in response to setting the endpoints to the default value.

19. A method for processing graphics comprising:
receiving, in a graphics processor, pixel data for a pixel block;
determining, in the graphics processor, first endpoints for first component values of the pixels in the pixel block, the endpoints corresponding to a first component of a multi-component plane comprising a first number of components;
determining a first error for the first endpoints;
determining, in the graphics processor, second endpoints for second component values of the pixels in the pixel block, the second endpoints corresponding to a second component of another multi-component plane comprising no more than three components;
determining a second error for the second endpoints;
comparing the first error for the first endpoints corresponding to the first component of the multi-component plane comprising four components to the second error for the second endpoints corresponding to the second component of the other multi-component plane comprising no more than a second number of components that is less than the first number of components;
selecting one of the first endpoints or the second endpoints as selected endpoints in response to the comparing of the first error to the second error; and
generating, in the graphics processor, a compressed data block representative of the pixel block in response to the selected endpoints for the pixel block and a weight for each pixel of the pixel block corresponding to the selected endpoints.

20. The method according to claim 19, wherein a division operation is performed for each pixel of the pixel block, a dividend of the division operation comprises a value of the pixel and a divisor of the division operation comprises a range of the selected endpoints, a remainder of the division operation is used as an estimate of the error for weighting each pixel.

* * * * *